Oct. 14, 1952  R. M. GILSON ET AL  2,614,151
MEANS FOR DETERMINING THE RESISTANCE OF INSULATED JOINTS
Filed July 30, 1948

INVENTORS
Robert M. Gilson and
BY Paul N. Martin.
THEIR ATTORNEY

Patented Oct. 14, 1952

2,614,151

UNITED STATES PATENT OFFICE 2,614,151

MEANS FOR DETERMINING THE RESISTANCE OF INSULATED JOINTS

Robert M. Gilson, Pittsburgh, and Paul N. Martin, Penn Township, Allegheny County, Pa., assignors to Westinghouse Air Brake Company, a corporation of Pennsylvania Application July 30, 1948, Serial No. 41,694

6 Claims. (Cl. 175—183)

Our invention relates to means for determining the resistance of insulated joints between adjacent conductors, and particularly to improved means for determining the resistance of insulated rail joints used for insulating block sections in railway signaling systems.

It is not practical to directly measure the resistance of insulated rail joints in service, due to the leakage resistance from rail to rail through the ground, which is variable and may sometimes be only a few ohms, and which is effectively connected in parallel with the resistance of the insulated joint.

It has heretofore been proposed to test the resistance of insulated rail joints by inductive methods in which periodically varying current is supplied to the rails on either side of an insulated joint, and the current which flows through the insulated joint induces an alternating current in an induction device placed near the joint. The current is detected by a telephone receiver which produces a sound of a certain intensity. Then current is independently supplied to the telephone receiver from the same source by a circuit including a variable resistor and the resistor is adjusted so that sound of the same intensity is produced. The variable resistor may be calibrated to read the insulated rail joint resistance directly in ohms, since it may be considered that the same resistance must be inserted by the variable resistor as is inserted by the insulated joint in order that the same power is supplied to the telephone receiver to produce sound of equal intensity.

Such an arrangement necessitates the comparison of two sounds in the telephone receiver and determine when the sounds are of comparatively equal intensity. Such an arrangement for aurally comparing the two sounds for intensity is subject to several disadvantages, the greatest being the difference in acuteness of hearing of different persons who may operate the equipment. Additionally, variable results will be obtained with different levels of ambient noise which tends to blunt the hearing sense. Also, it is well recognized in the electrical measurement art, that the comparison method of determining electrical quantities, particularly resistances, does not afford as much sensitivity or accuracy as other methods, particularly the bridge or null detection method.

Accordingly, it is an object of our invention to provide improved means for determining the resistance of an insulated joint between two conductors and which means incorporates a visual indicator.

Still another object of our invention is to provide means for determining the resistance of an insulated joint and which will accurately measure the leakage current which flows through the joint and is not affected by current which may flow around the joint.

Another object of our invention is to provide means for determining the resistance of an insulated joint and in which means the flow of current in nearby conductors does not affect the accuracy of the apparatus.

Another object of our invention is to provide improved means of the type described employing a periodically varying current through the joint and providing a reference circuit the resistance of which may be adjusted to balance the current which flows through the joint.

Another object of our invention is to provide improved means of the type described in which the leakage current through the insulated joint and the current in a reference circuit are balanced with a provision of improved means for detecting such a balanced condition.

A further object of our invention is to provide improved means for determining the resistance of insulated joints in a conductor.

Other objects of our invention and features of novelty therein will be apparent from the following description taken in connection with the accompanying drawings.

In practicing our invention, we provide a suitable source of periodically varying current which is connected to the conductors on each side of the insulated joint, so that leakage current will flow through the joint. Additionally, we provide a reference circuit to which energy is supplied from the source of periodically varying current, and which reference circuit includes an insulated wire or conductor and a variable resistor connected in series. The insulated conductor of the reference circuit is disposed along the insulated joint and the circuit is arranged so that the instantaneous polarity of the current which flows through the insulated conductor is opposite to the instantaneous polarity of the leakage current which flows through the insulated joint.

Since the energy which flows through the leakage resistance of the insulated joint and that which flows through the reference circuit including the variable resistor are supplied from the same source, the current flowing through the reference circuit will be equal to the current flowing through the leakage resistance of the insulated joint, if the resistance of the reference circuit is equal to the leakage resistance of the insulated joint.

Accordingly, the variable resistor in the reference circuit is adjusted until the current which flows through the reference circuit is equal to the current which flows through the insulated joint, at which time the resistance of the reference circuit is equal to the resistance of the insulated joint, and the variable resistor may be calibrated to directly show this value in ohms, or it may be calibrated to directly indicate the leakage current which flows through the insulated joint.

In order to detect the point of balance where the current through the insulated joint is equal to the current flowing in the reference circuit, a transformer or receiver is provided which is constructed and arranged so that its core structure may be clamped around both the insulated joint and the insulated conductor of the reference circuit lying alongside the insulated joint. The transformer is provided with one or more receiver windings mounted on the core and arranged so that the voltage induced in the windings is proportional to the current which flows through a conductor or conductors encircled by the core structure. Accordingly, the voltage induced in the windings of the transformer when clamped around the insulated joint and the insulated conductor adjacent the joint will be proportional to the difference of the values of current flowing through the insulated joint and the insulated conductor of the circuit, since the polarities of these two currents are opposite.

When the currents flowing through the insulated joint and the reference circuit are equal, no voltage will be induced in the windings of the transformer. Such a state of balance may be detected by providing a suitable type of indicator preferably of the visual type, such as a galvanometer. In order to achieve such a state of balance, the variable resistor in the reference circuit is adjusted until the null detector shows that a balance has been secured. The resistor in the reference circuit is then equal to the leakage resistance of the insulated joint, since both currents are supplied from the same source and the resistance of the remaining portion of the reference circuit may be considered negligible in comparison with the resistance of the variable resistor connected in series therewith.

We shall describe three forms of apparatus embodying our invention and shall then point out the novel features thereof in claims.

In the drawings.

In each of the different views like reference characters are used to designate similar parts.

Figures 1, 2, 3:
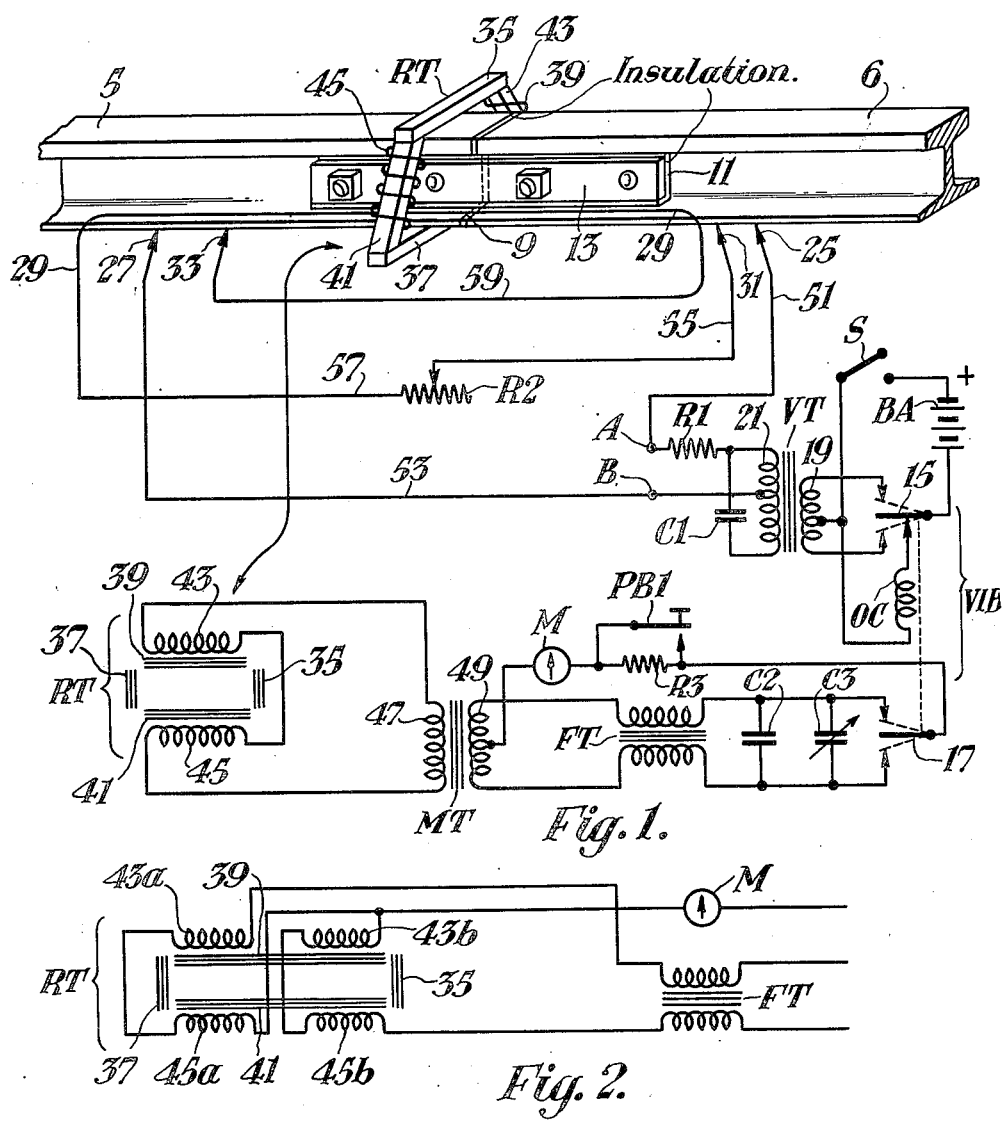
Fig. 1 is a diagrammatic view showing the application of a preferred form of our invention to an insulated joint between two adjacent rails of a railway track.
Fig. 2 is a diagrammatic view showing a modification of the rail transformer of Fig. 1 to lessen the influence of extraneous magnetic fields and eliminate the need for an additional transformer in the detection portion of the apparatus.
Fig. 3 is a diagrammatic view showing a modification of our invention employing a ballistic galvanometer and a source of direct current.

It is to be understood our invention is not limited to measuring the resistance of insulated rail joints and this one application illustrates one of the many places in which the apparatus is useful.

Referring to Fig. 1, there are shown two sections of rail 5 and 6 insulated from each other by means of an end post 9 made of suitable insulation material such as fiber. An insulating plate 11 is laid between the webs of the rails 5 and 6 and the fish plate 13 which is held in place by means of proper bolts and nuts provided with insulating bushings and washers, not shown. A similar fish plate and insulating plate are provided on the other side of the rails, not shown. Such an arrangement is that of the well-known insulated rail joint provided to insulate the rails 5 and 6 and the apparatus of our invention provides means for determining the leakage resistance between one rail and the other through the joint.

The apparatus includes a source of alternating current, here shown as a vibrator VIB, with its associated transformer VT and a battery BA. The construction and operation of the vibrator VIB may be similar to those well-known in the radio art, and it is deemed sufficient to point out that when the switch S is closed, energy from the battery BA flows through the operating coil OC of the vibrator and through the contact 15 of the vibrator and returns to the battery. The supply of energy to the operating coil OC causes the vibrator to operate its contacts 15 and 17 at a rate determined by the natural frequency of the vibrating reed usually employed in such a device. As a result of the operation of contact 15 of the vibrator VIB, energy is supplied to the primary winding 19 of the vibrator transformer VT from the battery BA and is alternately supplied to the upper and lower halves of the winding by a circuit which is obvious on the drawing. The alternate supply of energy to the upper and lower halves of the primary winding 19 of transformer VT causes an alternating current voltage to be induced in the secondary winding 21 of the transformer VT, and the frequency of this alternating current voltage is determined by the frequency at which the vibrator VIB operates, for example, say, 115 cycles per second. A condenser C1 is connected across the terminals of the secondary winding 21 of the transformer VT to provide the usual arc suppression, to thereby prolong the life of the contact 15 of the vibrator. Alternating current energy is supplied from a portion of the secondary winding 21 of transformer VT to the terminals designated by the reference characters A and B through a resistor R1, which serves to limit the flow of current should an accidental short circuit occur while the equipment is being operated.

It is contemplated that flexible leads 51 and 53 will be connected to the terminals A and B, and provided with suitable connectors for connecting the ends of the leads at points designated by the reference characters 25 and 27 to the rail on either side of the insulated joint, so that alternating current energy supplied to the terminals A and B is thereby impressed across the insulated joint.

A reference circuit is connected across the insulated joint by being connected to the rails 5 and 6 at points designated by the reference characters 31 and 33. Specifically the reference circuit comprises connector 31, lead wire 55, a variable resistor R2, lead wire 57, a flexible insulated conductor 29, lead wire 59 and connector 33. The flexible insulated conductor 29 is disposed to lie on the rails in close proximity to the insulated joint for reasons to be subsequently explained.

The apparatus is arranged and disposed so that the current which flows through the leakage resistance of the insulated joint and the current which flows through the flexible conductor 29 of the reference circuit are in opposite directions, as will be clear from the following example. If the instantaneous polarity of the alternating current source is assumed to be positive at terminal A, it will be seen that energy will flow from terminal A, through lead wire 51 and the connection to rail 6 at point 25, through the leakage resistance of the insulated joint, through the connection to the rail 5 at point 27, and lead wire 53 to the terminal B. Accordingly, the direction of flow of energy through the insulated joint at this time is from right to left. Energy also flows through a circuit including the reference circuit, which may be traced from terminal A over the contacts 25 and 31 of rail 6, the reference circuit previously traced through the contacts 33 and 27 at rail 5, and return to terminal B. It will be seen that the direction of flow of energy in the flexible conductor 29 of the reference circuit at this time is from left to right. It will be obvious that when the instantaneous polarity of the alternating current energy changes, the direction of flow of energy in the insulated joint and in the reference circuit will also change, but directions of the currents will still be opposite with respect to each other.

It will be apparent that since both the current through the leakage resistance of the insulated joint and the current through the reference circuit including the variable resistor R2 are supplied from the same source, namely, the terminals A and B of secondary winding 21, the current through the reference circuit including resistor R2 will be the same as the current which flows through the leakage resistance of the insulated joint. The resistance of the reference circuit is adjusted to have the same value as the resistance of the insulated joint, even though the currents are opposite in direction. Accordingly, the current in the reference circuit including the flexible conductor 29 may be adjusted to the same value as the current through the leakage resistance of the joint by proper adjustment of the variable resistance R2. In this connection it is to be noted that the various connections to the rails, the lead wires and the flexible conductor 29 are of sufficient size to have a negligible resistance in comparison with the resistances encountered in the insulated joint and the variable resistance R2.

From the foregoing, it will be seen that it is possible to balance the current which flows through the insulated joint against the current which flows through the reference circuit, and thus it is possible to determine the resistance of the insulated joint.

Since the currents through the insulated joint and through conductor 29 are of opposite instantaneous polarity, it will be obvious that when they are of equal magnitude, the magnetic fields around the rails and joint and conductor 29 generated by the currents will be opposite in relative polarity and therefore will cancel each other. The conductors 53, 57, and 59 are preferably located far enough away from the rail that the magnetic fields produced by the currents in them are relatively small in the immediate vicinity of the rail joint.

Such a detection of balance in the currents which flow through the insulated joint and through the reference circuit is made by means of a null detector which comprises a rail transformer RT, a meter transformer MT, filter choke FT and filter condensers C2 and C3, contact 17 of the vibrator VIB, a resistor R3 which is shunted by a push button PB1, and a direct current galvanometer M.

The rail transformer RT comprises a magnetizable core having four legs 35, 37, 39, and 41 and the core is arranged in substantially rectangular form, as shown in the drawings, and is constructed and arranged so that it may encircle the rail at the location of the insulated joint. For example, the legs 35, 39, and 41 may be rigidly assembled, while the leg 37 may be arranged to be detachable by means of quick-operating clamps, not shown, so that the transformer may be removed from the rails quickly in the event of an approaching train. The rail transformer RT is provided with two windings 43 and 45 disposed on the legs 39 and 41 of the core, as shown. To simplify the explanation of the circuit arrangement, the rail transformer RT with the four legs of its core and the windings are shown in simplified form in the lower portion of Fig. 1, the mechanical arrangement being shown at the upper portion of Fig. 1 encircling the rail at the insulated joint and the conductor 29 lying alongside of the joint.

The windings 43 and 45 of the transformer RT are connected so that voltages induced in their windings are additive, in other words, the windings 43 and 45 are connected in a series aiding circuit.

From the foregoing, it will be seen that with the rail transformer RT in place encircling the insulated joint and the flexible insulated conductor 29 of the reference circuit, the magnetic flux set up by the alternating current which flows through the leakage resistance of the insulated joint and that which flows through the flexible conductor 29 will cause an electromotive force to be induced in the windings 43 and 45 of the rail transformer. As previously explained, when the resistance of the insulated joint is matched by the resistance R2 in the reference circuit, the current which flows through the insulated joint and through the flexible conductor 29 will be equal and opposite in polarity. Accordingly, the magnetic flux generated by these two currents will cancel out, so that no voltage will be induced in the windings 43 and 45 of the rail transformer RT. However, if an unbalance exists between the currents which flow through the insulated joint and the reference circuit, voltage will be induced in the windings 43 and 45 of the transformer RT which will have a magnitude and polarity dependent upon which of the two currents is larger, that is, the current in the reference circuit including flexible conductor 29 or the current in the insulated joint.

If the inductive reactance of the reference circuit is slightly different from that of the circuit including the leakage resistance of the insulated joint, it may be found necessary to adjust the relative phase relation of the currents in these circuits to obtain perfect balance between them and extreme accuracy of measurement. This adjustment can be made, for example, by means of a variable inductance or capacitor in series or in multiple with resistor R2 in accordance with well-known methods in the art of alternating current bridge methods of measurement.

From the foregoing, it will be evident that the amount of unbalance between the currents in the insulated joint and in the reference circuit may be determined by measuring the magnitude and phase of the voltage induced in the windings 43 and 45 of the rail transformer RT. It will also be evident that such a measurement will give a true indication of the current which flows through the insulated joint, since it is only that current which is capable of creating a magnetic flux which may be balanced by the magnetic flux generated by the flow of current through the flexible conductor 29 of the reference circuit.

Accordingly, energy which is supplied from the alternating current source through the terminals A and B to the rail connections and which leaks past the insulated joint through the ballast resistance will have no effect upon the measurement of resistance of the joint. Also the current flowing in the various lead wires will have substantially no effect on the rail transformer RT.

As shown, the voltage induced in the windings 43 and 45 of the rail transformer RT is supplied to a primary winding 47 of a transformer MT, which has a secondary winding 49 having a center tap. The center tap of secondary winding 49 of transformer MT is connected to one terminal of a direct current galvanometer M, the other terminal of the galvanometer being connected through a resistance R3 to the contact 17 of the vibrator VIB. The resistance R3 is capable of being shunted by a push button PB1, so that in making final adjustments, the protective resistance R3 may be shunted out of the circuit, thus providing greater sensitivity for the direct current galvanometer M. Contact 17 of vibrator VIB alternately connects the terminal of the galvanometer M to the upper and lower terminals of the secondary winding 49 of the transformer MT through a filter comprising a filter choke FT, and the filter condensers C2 and C3. The filter is tuned to the frequency of the energy supplied by the vibrator, in the example cited 115 cycles per second. The condenser C3 may be of the variable type to provide for adjusting the capacitance of the condenser in order to provide a method for adjusting the phase angle of the current in the galvanometer circuit so as to match up properly with the operation of the contact 17, to thereby provide a more efficient application of the alternating current energy supplied from the secondary winding 49. Such an arrangement of a vibrator to provide rectification is well-known in the radio art, such vibrators being termed synchronous vibrators.

From the foregoing, it will be seen that alternating current voltage induced in the coils 43 and 45 of the transformer RT is supplied to the transformer MT, rectified by the operation of the contact 17 of the vibrator, and the rectified direct current is thereafter supplied to the direct current galvanometer M, which is preferably of the center zero type, that is, capable of being deflected in either direction from its zero or rest position, to thereby indicate the magnitude and polarity of the energy supplied thereto.

In operation, the equipment of Fig. 1 is connected as shown and described above, and the switch S is closed to start the vibrator VIB to thereby supply alternating current energy to the apparatus. The rail transformer RT having previously been placed in position around the insulated joint and the flexible conductor 29 connected to the apparatus, the deflection of the galvanometer M is observed. By varying the resistance R2, the current in the reference circuit and that which flows through the leakage resistance of the insulated joint may be balanced, such condition being noted by the meter M remaining in its center or zero position. In order to secure a finer balance with higher sensitivity, the push button PB1 is depressed, shunting the resistor R3, so that a larger current may flow through the galvanometer M, and the resistor R2 is then adjusted to provide zero deflection of the galvanometer M, at which time the resistance R2 is then equal to the leakage resistance of the insulated joint. The variable resistance R2 may be calibrated directly to give the resistance of the insulated joint in ohms or it may be calibrated in terms of the leakage current which flows through the insulated joint.

From the foregoing, it will be seen that our invention provides means for determining the resistance of an insulated joint by the use of simple equipment which may be easily and quickly set up and operated. The arrangement of apparatus embodying our invention is particularly suited for measuring the insulated joint resistance between the rails of block sections of a railway signaling system, since the measurement of resistance is not affected in any way by the leakage current which may pass from one rail to the other through the ballast. Additionally, the apparatus shown in Fig. 1 embodying our invention may be combined in a readily portable apparatus, which may be quickly applied to an insulated joint when testing the joint, and is arranged and constructed so that in the event of an approaching train, the apparatus may be quickly disconnected and removed from the rails. The sensitivity of the apparatus is indicated by the result of a laboratory test in which full scale deflection of a galvanometer of 15 microamperes range was obtained with only 0.05 ampere of alternating current flowing through the joint.

Referring to Fig. 2, there is shown a modified arrangement of the rail transformer RT which permits the elimination of the meter transformer MT of Fig. 1, and is additionally advantageous in that it eliminates the effect of extraneous magnetic fields which may be set up by nearby current-carrying conductors.

As shown, the windings on the legs 39 and 41 of the rail transformer RT are divided into two equal portions, 43a and 43b on leg 39, and windings 45a and 45b on the leg 41 of the core. The windings 43b and 45b on opposite legs of the core are connected in series aiding, and the windings 43a and 45a on opposite legs of the core are additionally connected in series aiding, with the windings 45a and 43b connected to the meter M, and the windings 43a and 45b connected to the filter transformer FT, thereby producing the equivalent of the center tap secondary winding 49 of transformer MT of Fig. 1. The remainder of the apparatus is similar to that shown in Fig. 1 and need not be illustrated or described. The arrangement of windings of the rail transformer RT as shown in Fig. 2 provides a balanced circuit, which is unaffected by an external magnetic flux, which tends to influence one set of coils on one leg of the transformer more than the windings on the other leg of the transformer. However, a magnetic flux which is symmetric with respect to the coils, will induce voltage in the coils in the manner described in Fig. 1.

For example, if extraneous magnetic flux threads the legs 39 and 41 of the core, and produces greater magnetization of the leg 39 of the core than it produces in the leg 41, opposing voltages will be induced in the windings 43a and 43b, relative to those in windings 45a and 45b and of greater magnitude. With windings 43a and 45a in series, however, the voltage that appears across these two windings because of the difference in their individual magnitudes will be exactly offset by the similar voltage difference in windings 43b and 45b. This arrangement is advantageous in preventing extraneous magnetic fields from influencing the operation of the apparatus. Such extraneous magnetic fields may be set up by nearby current-carrying conductors, or even by the other rail of the track if it is carrying an alternating current.

Referring to Fig. 3, there is shown a modification of the apparatus shown in Fig. 1 which employs a ballistic type of direct current galvanometer and a source of direct current. The rail connections are the same as shown in Fig. 1, and it is not deemed necessary to show or explain these connections in Fig. 3. Direct current is supplied through the joint and the reference circuit from the terminals A and B, as in Fig. 1, the terminals A and B being supplied with energy from the battery BA through a push button PB2 and the limiting resistor R1. Accordingly, when the push button PB2 is closed, direct current will flow through the insulated joint and through the reference circuit in opposite directions, thereby setting up a varying magnetic field during the time that the current rises to its full value. When the push button PB2 is released, the supply of energy to the reference circuit and through the insulated joint is interrupted, and during the time that the current is falling to zero value, the magnetic field set up by the current through the insulated joint and the reference circuit collapses, so that voltage is induced in the windings 43 and 45 of the rail transformer RT. The windings 43 and 45 of the rail transformer RT are connected in series aiding to a ballistic galvanometer BG. Such a type of galvanometer is well-known in the electrical art, and is characterized by indicating the total quantity of electricity which passes through the galvanometer in a given time rather than indicating the instantaneous value of the current which passes through the galvanometer circuit.

In operation, the equipment is connected and arranged as shown in Fig. 1, the rail connections being made in the same manner and the rail transformer placed so as to encircle the insulated joint and the flexible conductor 29. The push button PB2 is then closed and opened, and the deflections of the ballistic galvanometer BG are noted in each case. The resistor R2 is then adjusted until the closing and opening of the push button PB2 no longer causes deflection of the galvanometer. At this time it will be seen that the current which flows through the leakage resistance of the insulated joint and through the resistor R2 of the reference circuit are equal, so that the resistance of the insulated joint is matched by the variable resistor R2, which as previously explained in connection with Fig. 1, may be calibrated to read directly in ohms.

From the foregoing it will be seen that our invention provides means for easily and quickly determining the resistance of an insulated joint in a conductor, especially where such an insulated joint is shunted by comparatively low resistance, such as in a railway signal track circuit.

Although we have herein shown and described only three forms of means for determining the resistance of insulated joints which embody our invention, it is to be understood that various changes and modifications may be made therein within the scope of the appended claims, without departing from the spirit and scope of our invention.

Having thus described our invention, what we claim is:

1. In a device for determining the resistance of an insulated joint, the combination comprising a source of varying current connected across the insulated joint to be tested, a reference circuit comprising a conductor disposed adjacent said insulated joint and a variable resistance connected in series, said reference circuit being connected across said joint and being arranged and disposed so that the direction of flow of current from said source through said conductor is opposite to the direction of flow of current from said source through said insulated joint, and null detecting means for detecting a balance in the currents through said reference circuit and said insulated joint, said null detecting means comprising a magnetizable core adapted to be disposed in inductive relationship with said joint and said conductor, a plurality of windings disposed on opposite legs of said core, said windings being arranged and connected so that voltages induced therein by flux which is produced by the flow of current through said insulated joint and said conductor are additive, but voltages which are induced therein by extraneous flux are cancelled, and means for measuring the magnitude and phase relationship of the voltages induced in said windings with respect to the voltage of said source.

2. In a device for determining the resistance of an insulated joint, the combination comprising a source of alternating current, means for connecting said source across the insulated joint to be tested, a reference circuit connected across said joint and comprising a conductor disposed along said joint and a variable resistance connected in series, said reference circuit being connected and arranged so that the voltage supplied from said source across said insulated joint is also supplied to said reference circuit and the alternating current which flows through said conductor in said reference circuit is substantially 180° out of phase with the current which flows through said joint, and null detecting means for detecting the magnitude of said currents comprising a magnetizable core adopted to be disposed in inductive relationship to the fluxes set up by the currents in said joint and said conductor, a winding on said core inductively energized by said flux, and means for measuring the magnitude and phase relationship of the voltage induced in said winding with respect to the voltage of said source.

3. In a device for determining the resistance of an insulated joint, the combination comprising a source of varying current including a battery and a switch, means for connecting said source across the joint to be tested whereby current from said source flows through the leakage resistance of said joint in a given direction, a reference circuit comprising a conductor disposed along the joint to be tested and a variable resistance connected in series across said joint and being arranged and disposed so that the current which flows through said conductor is in the opposite direction from said given direction, a magnetizable core having a winding disposed thereon and arranged and constructed to be disposed in inductive relationship with the flux set up by the current which flows through said joint and the flux set up by the current which flows through said conductor, and a null detector including a ballistic galvanometer having its terminals connected across said winding.

4. In a device for determining the resistance of an insulated joint, the combination comprising a source of alternating current having a predetermined frequency, said source including a vibrating tuned reed alternator having two contacts operated in synchronism and tuned to vibrate at said predetermined frequency, a battery for supplying energy to said vibrator, and a vibrator transformer having a primary winding and a secondary winding, said primary winding of the vibrator transformer being connected to said battery by a circuit including one of said contacts of said tuned reed alternator, circuit means for connecting the secondary winding of said vibrator transformer across the insulated joint to be tested, a reference circuit including a conductor and a variable resistance connected in series across said insulated joint in such manner that the current which flows through said conductor is in the opposite direction to that which flows through the leakage resistance of the insulated joint for any given instantaneous polarity of the current supplied from the secondary winding of said vibrator transformer, a magnetizable core having four legs and adaptable to encircle said joint and said conductor, a pair of receiver windings disposed on opposite legs of said core and connected in series aiding so that the flux generated by the alternating current in said conductor and the current which flows through the leakage resistance of said joint induce voltages in said receiver windings which are proportional to the difference of the values of the currents in said reference circuit and said insulated joint, and means for determining the value of the voltages induced in said windings comprising a filter tuned to said predetermined frequency, a direct current meter and rectifying means including the other of said contacts of the tuned reed alternator, said direct current meter being connected to said windings through said filter and said rectifying means.

5. In a device for determining the resistance of an insulated joint, the combination comprising a source of alternating current having a predetermined frequency, said source including a vibrating tuned reed alternator having two contacts operated in synchronism and tuned to vibrate at said predetermined frequency, a battery for supplying current to said vibrator, and a vibrator transformer having a primary winding and a secondary winding, said primary winding of the vibrator transformer being connected to said battery by a circuit including one of said contacts of said tuned reed alternator, circuit means for connecting the secondary winding of said vibrator transformer across the insulated joint to be tested, a reference circuit including a conductor and a variable resistance connected in series across said insulated joint in such manner that the energy which flows through said conductor is in the opposite direction to that which flows through the leakage resistance of the insulated joint for any given instantaneous polarity of the energy supplied from the secondary winding of said vibrator transformer, a magnetizable core having four legs and adaptable to encircle said joint and said conductor, a pair of receiver windings mounted on each of two opposite legs of said core, a first pair of said windings being disposed on one of said opposite legs, and the second pair of said windings being disposed on the other of said opposite legs of the core, each of said first pair of windings being connected in series with one of the windings of said second pair of windings, and said windings being connected so that voltage induced in one pair of windings by extraneous magnetic flux is balanced out, but the voltage induced in the windings by magnetic flux which is produced by the flow of current through said insulated joint and said conductor will induce voltage in said windings which is proportional to the rate of change of current which generates the flux and is proportional to the rate of change of the difference of the values of the currents in said reference circuit and said insulated joint, and means for determining the value of the voltage induced in said receiving windings comprising a filter tuned to said predetermined frequency, a direct current meter and rectifying means including the other of said contacts of the tuned reed alternator, said direct current meter being connected to said windings through said filter and said rectifying means.

6. In a device for determining the resistance of an insulated joint, the combination comprising a source of alternating current having a predetermined frequency, said source including a vibrating tuned reed alternator having two contacts operated in synchronism and tuned to vibrate at said predetermined frequency, a battery for supplying energy to said vibrator, and a vibrator transformer having a primary winding and a secondary winding, said primary winding of the vibrator transformer being connected to said battery by a circuit including one of said contacts of said tuned reed alternator, circuit means for connecting the secondary winding of said vibrator transformer across the insulated joint to be tested, a reference circuit including a conductor and a variable resistance connected in series across said insulated joint in such manner that the current which flows through said conductor is in the opposite direction to that which flows through the leakage resistance of the insulated joint for any given instantaneous polarity of the current supplied from the secondary winding of said vibrator transformer, a magnetizable core having four legs and adaptable to encircle said joint and said conductor, a pair of receiver windings disposed on opposite legs of said core and connected in series aiding so that the flux generated by the alternating current in said conductor and the current which flows through the leakage resistance of said joint induce voltages in said receiver windings which are proportional to the difference of the values of the currents in said reference circuit and said insulated joint, and means for measuring the magnitude and phase relationship of the energy induced in said windings with respect to the voltage of the energy supplied from the secondary winding of said vibrator transformer, comprising a direct current meter, rectifying means including the other of said contacts of said alternator, circuit means for connecting said meter to said windings through the rectifying contact, and phase shifting means connected to said windings for shifting the phase of the energy supplied from said windings.

ROBERT M. GILSON.
PAUL N. MARTIN.

REFERENCES CITED

The following references are of record in the file of this patent:

UNITED STATES PATENTS

| Number | Name | Date |
|---|---|---|
| 1,464,119 | Stoller et al. | Aug. 7, 1923 |
| 1,538,383 | Bullard | May 19, 1925 |
| 1,652,405 | Holliday | Dec. 13, 1927 |
| 1,765,715 | Byers | June 24, 1930 |
| 1,908,297 | Anderson | May 9, 1933 |
| 1,944,954 | Sperry | Jan. 30, 1934 |
| 2,176,756 | Borden | Oct. 17, 1939 |
| 2,338,245 | Hays et al. | Jan. 4, 1944 |
| 2,357,666 | Kuehn | Sept. 5, 1944 |